US005335495A

United States Patent [19]

Sato et al.

[11] Patent Number: 5,335,495

[45] Date of Patent: Aug. 9, 1994

[54] BRAKE VALVE

[75] Inventors: Hitoshi Sato, Tsuchiura; Yukio Kanno, Chiyoda, both of Japan

[73] Assignee: Hitachi Construction Machinery Co., Ltd., Tokyo, Japan

[21] Appl. No.: 50,342

[22] Filed: May 13, 1993

[30] Foreign Application Priority Data

Sep. 30, 1991 [JP] Japan ................................ 3-278374

[51] Int. Cl.[5] ................................ F16D 31/02

[52] U.S. Cl. ................................ 60/461; 60/469; 60/466; 91/451

[58] Field of Search ................ 60/460, 461, 466, 469, 60/494; 91/31, 33, 437, 451

[56] References Cited

FOREIGN PATENT DOCUMENTS 31681 8/1987 Japan .

*Primary Examiner*—Edward K. Look
*Assistant Examiner*—F. Daniel Lopez
*Attorney, Agent, or Firm*—Antonelli, Terry, Stout & Kraus

[57] ABSTRACT

Described herein is a brake valve which is arranged to prevent low pressure relief actions by relief valves (59A) and (59B) at the time of starting an actuator, for improving the response characteristics and the safety of operation. This brake valve has relief valves (59A) and (59B) and check valves (70A) and (70B) located in coaxial positions, the check valves (70A) and (70B) being arranged to seat on fore end portions of valve seat members (62A) and (62B) when opened, thereby to substantially block the communication of the valve seat members (62A) and (62B) with inlet link passages (56A) and (56B). Therefore, when the check valve (70A) or (70B) is opened at the time of starting the actuator, the valve seat member (62A) or (62B) is supplied with only a throttled flow of hydraulic pressure through the notched portions (73A) or (73B). As a result, the hydraulic pressure from a hydraulic pump is quickly supplied to the hydraulic motor through charging/discharging passages (9) and (10) without entailing pressure drops.

4 Claims, 9 Drawing Sheets

BRAKE VALVE

FIELD OF THE ART

This invention relates to a brake valve suitable for use in a hydraulic circuit which drives a hydraulic motor of a power shovel or the like.

BACKGROUND OF THE ART

Generally, hydraulic construction machines such as power shovels and cranes are driven by a hydraulic motor or actuator in travelling or turning operations. For the purpose of preventing imposition of excessive inertial loads on the hydraulic motor at the time of stopping a travelling or turning operation, a brake valve is usually inserted in the hydraulic drive circuit thereby to absorb the inertial loads through conversion into thermal energy of the operating hydraulic pressure.

Such a brake valve is constituted, for example, by a counterbalance valve which is provided between a hydraulic pressure source and an actuator, a couple of relief valves located in positions closer to the actuator than to the counterbalance valve, and a couple of check valves located between the counterbalance valve and the respective relief valves (e.g., Japanese Utility Model Publication 62-31681).

The just-mentioned prior art brake valve is shown in FIGS. 6 through 9.

In these figures, indicated at 1 is a hydraulic motor serving as an actuator and constructed in the form of a radial piston type hydraulic motor, from a control pin 8, a rotor 11 and a piston 14, which will be described hereinlater. The hydraulic motor 1 has its inlet/outlet ports connected to a hydraulic pump 3 or a hydraulic pressure source through a pair of conduits 2A and 2B, so that it is rotationally driven by the operating oil pressure discharged from the hydraulic pump 3 which sucks in oil from a tank 4.

Indicated at 5 is a direction change-over valve which is located within the lengths of the conduits 2A and 2B between the hydraulic motor 1 and pump 3. The direction change-over valve 5 is manipulated by an operator to and from a neutral position (a) where the hydraulic motor 1 is at rest and two change-over positions (b) or (c) where the motor 1 is rotated either in the direction of arrow F or R.

The reference numeral 6 denotes a brake valve which is located within the lengths of the conduits 2A and 2B between the hydraulic motor 1 and direction change-over valve 5, and which is largely constituted by counterbalance valve 23, relief valves 28A and 28B, and check valves 39A and 29B, which will be described later. When the direction change-over valve 5 is held in the neutral position (a), the brake valve 6 opens either the relief valve 28A or 28B to relieve the oil pressure to the conduit 2A or 2B whichever is on the lower pressure side, thereby to apply brakes to the hydraulic motor 1.

FIG. 7 illustrates the hydraulic motor 1 in greater detail, in which the reference 7 indicates a motor casing of a lidded cylindrical shape having a cam surface 7A formed completely around its entire inner periphery and having its opening lidded with a valve casing 18.

Denoted at 8 is a control pin which is formed integrally with the valve casing 18 in such a manner as to project substantially from a center portion of the latter, the axis of the control pin 8 being offset from the axis of the cam surface 7A to a predetermined extent. In an axially intermediate portion, the control pin 8 is formed with a pair of charging/discharging passages 9 and 10, which are opened on the outer peripheral surface of the control pin 8 to serve as inlet/outlet ports for the hydraulic motor 1, as seen also in FIG. 8.

Indicated at 11 is a rotor which is rotatably mounted on the control pin 8 and which is provided with a plural number of radially extending cylinders 11A (only one of which cylinders 11A is shown in the drawing) at angularly spaced positions around the circumference thereof. Each one of the cylinders 11A is intermittently communicated with the charging/discharging passages 9 and 10 through a port 11B. The axis of the rotor 11 is disposed eccentrically relative to the axis of the cam surface 7A, forming an eccentric space 12 of a crescent shape between its outer periphery and the cam surface 7A.

Designated at 13 is an output shaft which is integrally provided on one end face of the rotor 11. This output shaft 13 is coupled with an external inertial body through a reducer (not shown) or the like, and rotatable integrally with the rotor 11 to transmit the rotation of the latter to the outside.

Indicated at 14 are pistons which are reciprocably received in the cylinders 11A, at 15 are balls which are rockably provided in the respective pistons 14, and at 16 are shoes which are located between the balls 15 and the cam surface 7A and in spaced positions in the circumferential direction. Each shoe 16 is fitted in an opposing ball 15 at its fore end and slidably engaged with the cam surface 7A at its rear end through guides 17.

Referring to FIGS. 7 to 9, the description is now directed to the brake valve 6.

As seen in these figures, the afore-mentioned valve casing 18 is attached to the open side of the motor casing 7 as a closure lid and firmly fixed to the latter by means of a plural number of bolts 19. The valve casing 18 is integrally formed with oil passages 20A and 20B, as will be described later, and provided with a counterbalance valve 23, relief valves 28A and 28B, and check valves 39 and 39B.

The oil passages 20A and 20B which are formed internally of the valve casing 18 constitute part of the conduits 2A and 2B, respectively. The oil passages 20A and 20B consist of oil passages 21A and 21B, which are located on the side of the oil pressure source and connected to the hydraulic pump 3 through the direction change-over valve 5, and oil passages 22A and 22B, which are located on the side of the actuator and connected to the hydraulic motor 1 through the charging-/discharging passages 9 and 10, respectively. Through check valves 39A and 39B, the oil passages 21A and 21B on the side of the hydraulic pressure source are communicated with the oil passages 22A and 22B on the side of the actuator, respectively.

Indicated at 23 is the counterbalance valve which is provided in the valve casing 18 in a position closer to the hydraulic pump 3. The counterbalance valve 23 is largely constituted by a spool sliding bore 24 which is integrally formed in the valve casing 18, and a spool 25 which is slidably fitted in the spool sliding bore 24. The spool 25 is provided with a land 25A which establishes or blocks communication between the oil passages 21A and 22A, and a land 25B which establishes or blocks communication between the oil passages 21B and 22B. The spool 25 has its opposite ends disposed in oil chambers 26A and 26B, respectively, and is urged into a neutral position by return springs 27A and 27B in the oil chambers 26A and 26B. The above-mentioned counterbalance valve 23 is operated in interlinked relation with the direction change-over valve 5, and switchable to either the change-over position (b) or (c) from the neutral position (a).

The references 28A and 28B denote a pair of relief valves which are provided in the valve casing 18 in positions closer to the hydraulic motor 1. As shown also in FIG. 9, the relief valves 28A and 28B include valve guides 29A and 29B, main valve bodies 32A and 32B and pistons 36A and 36B, respectively, to constitute crossover relief valves with the so-called shockless function, as will be described later.

The valve guides 29A and 29B, which constitute part of the relief valves 28A and 28B, are provided with passage holes 30A and 30B at the respective fore ends, which are disposed in the oil passages 22A and 22B on the side of the actuator.

The references 31A and 31B denote valve seat members of cylindrical shape, which are located opposingly to the valve guides 29A and 29B, and are in communication with the oil passages 22A and 22B on the side of the actuator, respectively. The main valve bodies 32A and 32B are slidably received in the valve guides 29A and 29B for seating on or unseating off the valve seat members 31A and 31B, respectively. The main valve bodies 32A and 32B are constantly urged in the closing direction by valve springs 33A and 33B, and provided with axial throttle passages 34A and 34B, respectively.

In this instance, the main valve bodies 32A and 32B are so dimensioned as to hold the relationship of $d > d_2$ where $d_1$ is the diameter of the seating portions to be engaged with the valve seat members 29A and 29B and $d_2$ is the diameter of the sliding portions in the valve guides 29A and 29B.

In case the pressure P1 in the respective valve seat members 31A and 31B is equal with the pressure P2 in the respective valve guides 29A and 29B, the main valve bodies 32A and 32B are disengaged from the valve seat members 31A and 31B against the action of the valve springs 33A and 33B to go into a high pressure relief action as soon as the pressure P1 reaches a predetermined valve opening pressure P0, due to the difference in pressure receiving area between $d_1$ and $d_2$.

On the other hand, in case the pressure P2 in the valve guides 29A and 29B is maintained at a level lower than the pressure P1 in the valve seat members 31A and 31B by the operation of floating pistons 38A and 38B, which will be described later, even if the pressure P1 is at a level lower than the predetermined valve opening pressure P0, the main valve bodies 32A and 32B are disengaged from the valve seat members 31A and 31B against the action of the valve springs 33A and 33B, respectively, communicating the oil passages 22A and 22B with each other to effect a low pressure relief action.

The references 35A and 35B indicate annular oil chambers which are formed between the valve casing 18 and the outer peripheries of the valve guides 29A and 29B, the inner ends of the oil chambers 35A and 35B being communicated with the oil passages 22A and 22B on the side of the actuator, respectively. The references 36A and 36B indicate annular pistons which are slidably received in the oil chambers 35A and 35B, the pistons 36A and 36B forming floating pistons 38A and 38B, as shown also in FIG. 6, in cooperation with throttle passages 37A and 37B axially formed in the valve guides 29A and 29B and the oil chambers 35A and 35B, respectively. As the oil pressure in the passages 22A and 22B on the side of the actuator flows into the valve guides 29A and 29B through the throttle passages 34A and 34B and then into the spaces at the outer ends of the oil chambers 35A and 35B through the throttle passages 37A and 37B, the pistons 36A and 36B are moved toward the fore ends of the valve guides 29A and 29B until they abut against the valve casing 18. At this time, the relief valves 28A and 28B maintain the valve opening pressure at a low level. Namely, the time period of displacement of the pistons 36A and 36B corresponds to the low pressure relief time.

Indicated at 39A and 39B are a pair of check valves which are provided within the lengths of the oil passages 20A and 20B at positions between the counterbalance valve 23 and the respective relief valve 28A or 28B. By the actions of valve springs 40A and 40B, these check valves 39A and 39B are constantly urged in the valve closing direction to seat on valve seats 41A and 41B which are formed between the oil passages 21A and 21B on the side of the pressure source and the oil passages 22A and 22B on the side of the actuator, respectively. Further, when the oil pressure from the hydraulic pump 3 is introduced into the oil passages 21A and 21B on the side of the pressure source, the check valves 39A and 39B are opened by the oil pressure against the action of the valve springs 40A and 40B, respectively, thereby permitting the oil pressure to flow into the oil passages 22A and 22B on the side of the actuator while blocking reverse flows of the oil pressure.

The reference numeral 42 denotes a shuttle valve which is provided in the valve casing 18 at a position closer to the hydraulic pump 3 than to the counterbalance valve 23 and which is in communication with the oil passages 21A and 21B on the side of the pressure source. The shuttle valve 42 selects either the oil passage 21A or 21B whichever is at a higher pressure level, for supplying part of the oil pressure to a brake device (not shown) or the like as a pilot pressure.

The prior art brake valve with the above-described construction operates in the manner as follows.

Firstly, if the direction change-over valve 5 is switched by an operator to the change-over position (b) from the neutral position (a), the oil pressure which is discharged from the hydraulic pump 3 is allowed to flow into the oil passages 21A on the side of the pressure source through the conduit 2A. Then, due to a pressure differential between the oil passage 21A on the side of the pressure source and the oil passage 22A on the side of the actuator, the check valve 39A is opened against the action of the valve spring 40A, and the oil pressure in the oil passage 21A on the side of the pressure source is allowed to flow into the cylinders 11A of the rotor 11 through the oil passage 22A on the side of the actuator and the respective charging/discharging passages 9.

As a result, the pistons 14 are put in reciprocating movement within the cylinders 11A, causing the shoes 16 to slide along the cam surface 7A and turning the rotor 11 about the control pin 8. The rotation of the rotor 11 is led out through the output shaft 13 to drive the inertial body into rotation.

When the oil pressure is introduced into the oil passage 21A on the side of the pressure source, part of the oil is fed into the oil chamber 26A through the throttle passage of the spool 25, thereby urging the spool 25 in the rightward direction in FIG. 8. Consequently, the land 25B is moved to the right to communicate the oil passage 21B on the side of the pressure source with the oil passage 22B on the side of the actuator. That is to say, the counterbalance valve 23 is consequently switched to the change-over position (b) from the neutral position (a) shown in FIG. 6. The oil pressure which is pushed out of each cylinder 11A during its compression stroke is fed to the oil passage 22B on the side of the actuator through the charging/discharging passages 10, and then discharged from the oil passage 22B to the outside of the brake valve 6 through the oil passage 21B on the side of the pressure source, thereafter the oil being recirculated to the tank 4 through the direction change-over valve 5 and conduit 2.

Conversely, when the operator switches the direction change-over valve 5 from the change-over position (b) to the neutral position (a) to stop the rotation of the inertial body, the check valve 39A is urged to seat on the valve seat 41A by the action of the valve spring 40A, blocking communication between the oil passage 21A on the side of the pressure source and the passage 22A on the side of the actuator. Further, at the counterbalance valve 23, as a result of a pressure drop in the oil chamber 26A, the spool 25 is urged to return to the neutral position (a) by the biasing action of the return spring 27B, thereby blocking communication between the oil passage 21B on the side of the pressure source and the oil passage 22B on the side of the actuator.

However, even after the direction change-over valve 5 has been switched to the neutral position (a), the hydraulic motor 1 is forced to rotate continuedly under the influence of the inertial force of the inertial body which is coupled with the motor output shaft 13, still keeping the pumping action, sucking in the oil pressure from the primary oil passage 22A on the side of the actuator and discharging same to the secondary oil passage 22B on the side of the actuator. The pressure in the secondary oil passage 22B on the side of the actuator is gradually increased since return of oil pressure to the tank 4 is blocked by the counterbalance valve 3 and the check valve 39B.

Then, the oil pressure in the oil passage 22B on the side of the actuator flows into the valve guide 29B through the throttle passage 34B to act on the piston 36B from the valve guide 29B via throttle passage 37B. As a consequence, the piston 36B is slided within the oil chamber 35B toward the primary oil passage 22A on the side of the actuator. In the meantime, due to pressure losses in the throttle passages 34B and 37B, the pressure in the valve guide 29B is maintained at a lower level than the pressure in the oil passage 22B on the side of the actuator, so that the main valve body 32B is opened at a pressure level lower than the predetermined valve opening pressure Po for a relief at low pressure. Then, as the piston 36B is stopped by abutment against the valve casing 18, the pressure in the valve guide 29B becomes equal with the pressure in the oil passage 22B on the side of the actuator and rises to the preset valve opening pressure level to effect high pressure relief.

While the relief valve 28B is open, the oil passages 22A and 22B on the side of the actuator are communicated with each other, forming a closed circuit together with the charging/discharging passages 9 and 10. As a result, the oil pressure which is discharged from the hydraulic motor 1 is converted into thermal energy while being passed through the relief valve 28B, thereby absorbing the inertial force of the inertial body to produce a braking force.

In case the direction change-over valve 5 is switched to the change-over position (c) from the neutral position (a), the brake valve operates substantially in a similar manner, and therefore accounts in this regard are omitted to avoid repetitions.

In the above-described prior art brake valve employing the relief valves 28A and 28B in combination with accumulators 38A and 38B for the shockless function, the oil pressure is relieved at low pressure for a predetermined time period (for a predetermined time period of low pressure relief) until the pistons 36A and 36B in sliding movement are stopped, thereby preventing the shocks which might result from abrupt stoppage of the inertial body by sudden application of braking forces.

However, according to the prior art, even when the direction change-over valve is switched to the change-over position (b) or (c) from the neutral position (a) to drive the hydraulic motor 1, the oil pressure discharged from the hydraulic pump 3 acts on the pistons 36A and 36B through the oil passages 22A and 22B on the side of the actuator and the throttle passages 34A and 34B. Accordingly, the drive pressure is retained at a low pressure level until the pistons 36A and 36B are stopped by abutment against the valve casing 18. This involves a problem of low response characteristics such as a delay in driving the hydraulic motor 1 under high load conditions, for example, in a hill climbing or steering operation.

Besides, the hydraulic motor 1 is driven abruptly upon lapse of a predetermined time period (a time period of low pressure relief) or when the pistons 36A and 36B in sliding movement come to a stand, so that the operator feels as if the inertial body were suddenly put in operation. This can deteriorate the safety of operation to a considerable degree.

Moreover, the time period of low pressure relief by the accumulators 38A and 38B is determined by the flow areas of the throttle passages 34A and 34B, bored in the main valve bodies 32A and 32B, and of the throttle passages 37A and 37B. Therefore, further deteriorations in response characteristics take place at lower ambient temperatures which are reflected by a higher viscosity of the operating oil and a longer time period of low pressure relief as compared with normal or ordinary ambient temperatures. This also gives rise to a problem that the safety of operation is impaired to a considerable degree.

In view of the above-discussed problems of the prior art, the present invention has as its object the provision of a brake valve which can suppress the low pressure relief by relief valves at the time of starting an inertial body, which serves as an actuator, for the purpose of improving the response characteristics and safety of operation.

DISCLOSURE OF THE INVENTION

In order to solve the above-mentioned problems, the brake valve construction according to the present invention includes check valves which are located in particular positional relations with relief valves for restraining the oil pressure of the pressure source from flowing toward the relief valves at the time of opening the check valves, thereby suppressing low pressure relief actions by the respective relief valves.

Preferably, the relief valves and the check valves are located coaxially in such a manner that the inlets of the relief valves are substantially closed at the time of opening the check valves, thereby suppressing low pressure relief actions by the respective relief valves.

With the above construction, the check valves are opened as soon as the discharge oil pressure from the pressure source is fed to the corresponding oil passages, permitting the oil pressure from the pressure source to flow toward the actuator while restraining the oil pressure from flowing toward the relief valves to suppress low pressure relief actions by the respective relief valves for improvement of the starting response characteristics.

The construction, having the relief valves and check valves arranged coaxially and in such a manner as to hold the inlet of the relief valves substantially in closed state by the check valves which are being opened, is suitably capable of restraining the oil pressure from flowing toward the relief valves at the time of opening the check valves, to suppress low pressure relief actions by the relief valves.

BEST MODE FOR CARRYING OUT THE INVENTION

Figure 1:
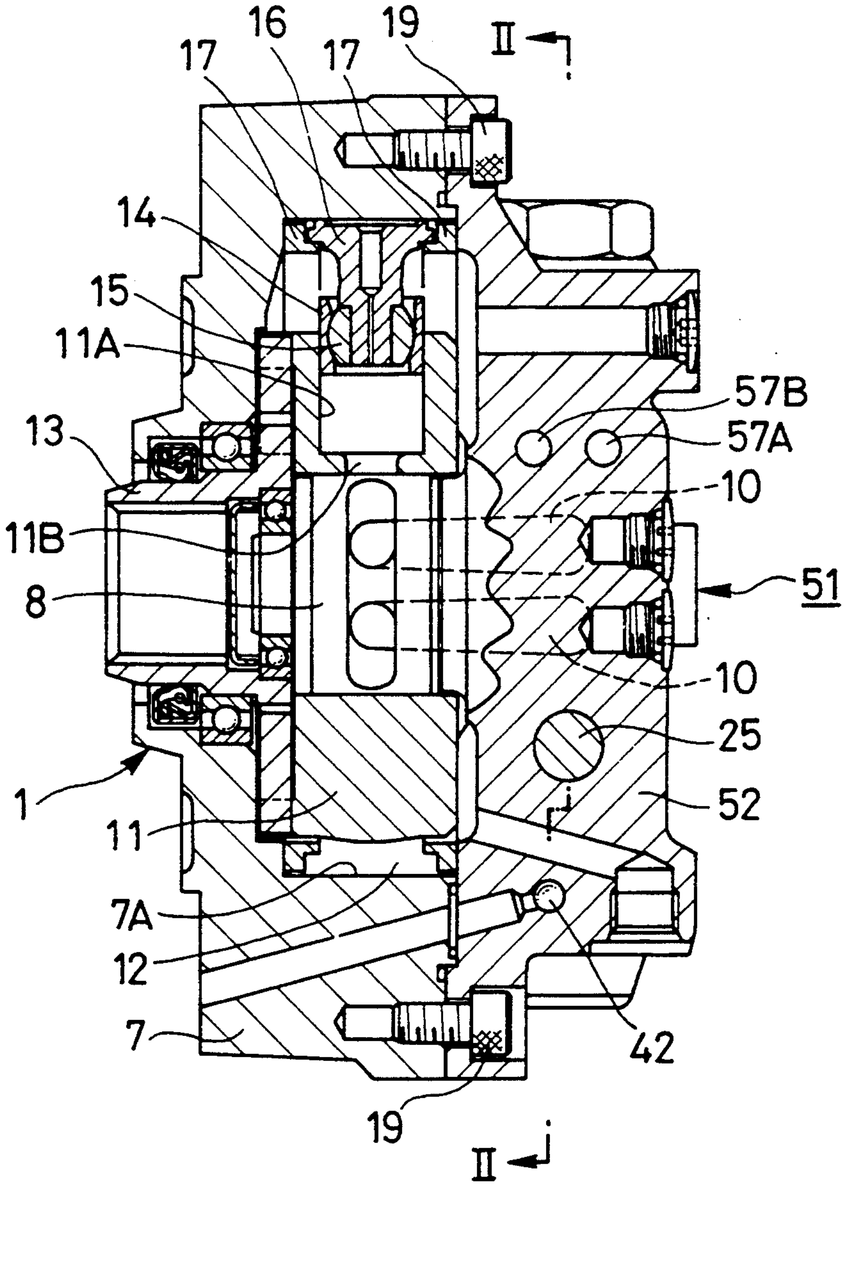
FIG. 1 is a vertical sectional view of a brake valve constituting a first embodiment of the invention.

Hereafter, the invention is described by way of its preferred embodiments with reference to FIGS. 1 through 5. In the following description of preferred embodiments, those component parts which are common with the prior art are designated by common reference numerals, and therefore accounts on these parts are omitted to avoid repetitions.

Figure 2:
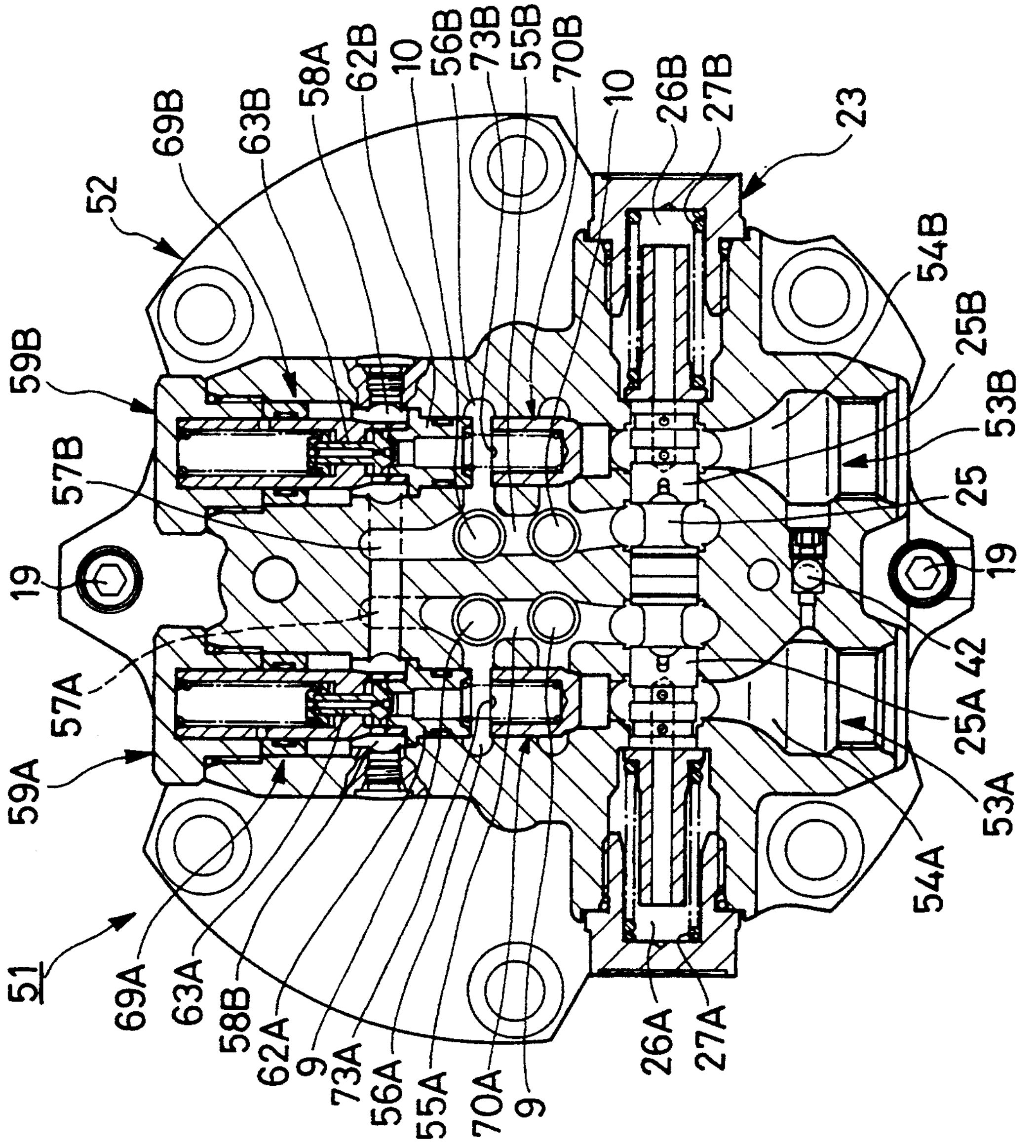
FIG. 2 is a sectional view taken on line II—II of FIG. 1.
Figure 3:
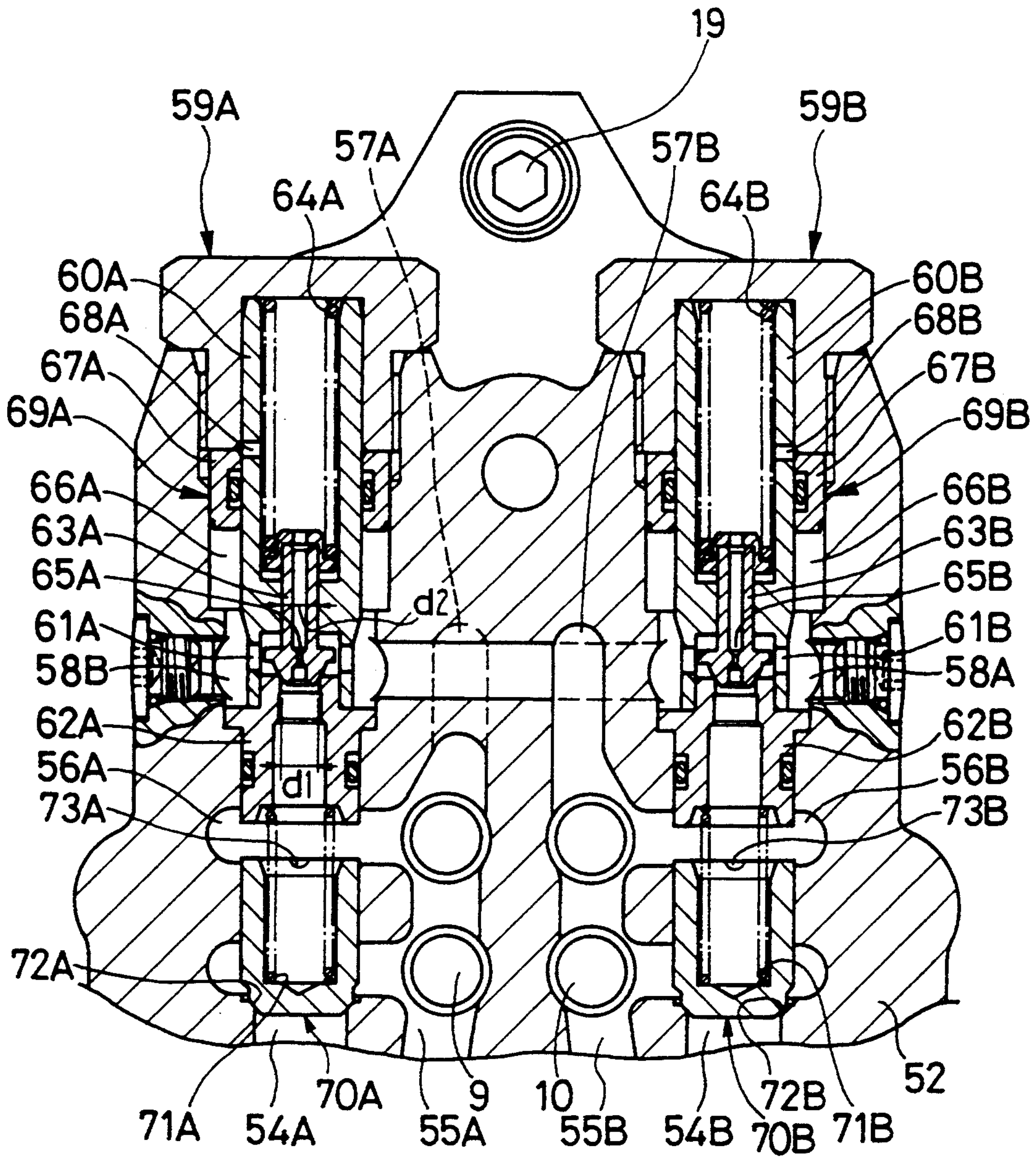
FIG. 3 is an enlarged sectional view of major parts shown in FIG. 2.

Referring now to FIGS. 1 to 3, there is shown a first embodiment of the present invention.

In these figures, the reference 51 denotes a brake valve according to the invention, which is provided between a hydraulic motor 1 and a direction change-over valve 5. Similarly to the above-described brake valve 6 of the prior art, the brake valve 51 is provided integrally with the hydraulic motor 1. However, in this case, it is constituted by a counterbalance valve 23, oil passages 53A and 53B, relief valves 59A and 59B, and check valves 70A and 70B, which will be described later. When the direction change-over valve 5 is switched to the neutral position (a), the brake valve 51 operates to apply a braking force to the hydraulic motor by opening either the relief valve 59A or 59B to relieve the oil pressure from a higher pressure side to a lower pressure side between conduits 2A and 2B.

The reference 52 denotes a valve casing firmly fixed to the motor casing 7 by means of bolts 19 as a closure lid which closes the open side of the latter. Similarly to the valve casing 18 of the prior art, the valve casing 52 is provided with oil passages 53A and 53B integrally therewith, along with a counterbalance valve 23, relief valves 59A and 59B and check valves 70A and 70B, as shown in FIG. 2.

According to the present embodiment, the valve casing 52 is provided with a pair of oil passages 53A and 53B which form part of the conduits 2A and 2B. Similarly to the above-described oil passages 20A and 20B of the prior art, the oil passages 53A and 53B are largely constituted by: oil passages 54A and 54B which are located on the side of the pressure source and connected to the hydraulic pump 3 through the direction change-over valve 5: and oil passages 55A and 55B which are located on the side of the actuator and connected to the hydraulic motor 1 through charging/discharging oil passages 9 and 10. The oil passages 55A and 55B are provided with inlet link passages 56A and 56B and outlet link passages 57A and 57B at certain positions within the lengths thereof.

The inlet link passages 56A and 56B are provided at certain positions within the lengths of the oil passages 55A and 55B on the side of the actuator, and are in communication with the oil passages 55A and 55B at the respective base ends and with valve seat members 62A and 62B, which will be described later, at the respective fore ends.

The outlet link passages 57A and 57B are provided in end portions of the oil passages 55A and 55B on the side the actuator to serve as relief passages, and are in communication with end portions of the oil passages 55A and 55B at the base ends, respectively. The fore ends of the outlet link passages 57A and 57B are extended toward the opposite oil passages 55B and 55A to form oil chambers 58A and 58B, respectively.

The references 59A and 59B indicate a pair of relief valves which are provided in the valve casing 52 at positions on the side of the hydraulic motor 1. Similarly to the relief valves 28A and 28B of the prior art, these relief valves 59A and 59B are arranged to constitute cross-over relief valves of the shockless type, by the use of valve guides 60A and 60B, main valve bodies 63A and 63B, and pistons 67A and 67B, which will be described later, as shown also in FIG. 3. However, in this case the relief valves 59A and 59B are located substantially in coaxial relation with the oil passages 54A and 54B on the side of the pressure source, respectively.

The valve guides 60A and 60B are provided in the valve casing 52 substantially in coaxial positions relative to the corresponding oil passages 54A and 54B on the side of the pressure source. The valve guides 60A and 60B have their fore ends disposed in the oil chambers 58A and 58B, respectively. Further, the valve guides 60A and 60B are provided with radial communication ports 61A and 61B in the respective fore end portions.

Indicated at 62A and 62B are valve seat members which are located opposingly to the valve guides 60A and 60B and substantially in coaxial positions relative to the corresponding oil passages 54A and 54B on the side of the pressure source. The valve seat members 62A and 62B are provided in the valve casing 52 such that their base end portions are disposed in the oil chambers 58A and 58B while their fore end portions are disposed in the inlet link passages 56A and 56B, respectively. The fore end portions of the valve seat members 62A and 62B are located at the inlets of the relief valves 59A and 59B, respectively.

The main valve bodies 63A and 63B are slidably received in the valve guides 60A and 60B for seating on and off the valve seat members 62A and 62B, respectively. The main valve members 63A and 63B are constantly urged in the valve closing direction by the biasing actions of valve springs 64A and 64B, respectively. Further, the main valve bodies 63A and 63B are formed with axial throttle passages 65A and 65B. To open and close the valves in a manner similar to the above-described counterparts of the prior art, the main valve members 63A and 63B are dimensioned to hold the relationship of $d_1 > d_2$ where $d_1$ is the diameter of seating portions of the valve seat members 62A and 62B and $d_2$ is the diameter of sliding portions in the valve guides 60A and 60B.

Indicated at 66A and 66B are annular oil chambers which are formed between the valve casing 52 and the valve guide 60A or 60B, and are communicated with the oil chambers 58A and 58B at the respective inner ends. The references 67A and 67B denote pistons which are slidably fitted in the oil chambers 66A and 66B, and the references 68A and 68B denote throttle passages which are formed in intermediate portions of the valve guides 60A and 60B, respectively. These oil chambers 66A and 66B, pistons 67A and 67B and throttle passages 68A and 68B constitute floating pistons 69A and 69B which are substantially similar to the floating pistons 38A and 38B of the prior art.

Indicated at 70A and 70B are a pair of check valves which are provided within the lengths of the oil passages 53A and 53B and between the counterbalance valve 23 and the relief valve 59A or 59B. Similarly to the afore-mentioned check valves 39A and 39B of the prior art, the check valves 70A and 70B are constantly urged in the valve closing direction toward valve seats 72A and 72B, which are formed between the oil passages 54A and 54B on the side of the pressure source and the oil passages 55A and 55B on the side of the actuator, by the biasing actions of valve springs 71A and 71B, respectively. However, in this instance, similarly to the above-described relief valves 59A and 59B, the check valves 70A and 70B are mounted in coaxial relations with the oil passages 54A and 54B on the side of the pressure source. The check valves 70A and 70B are provided with notched portions 73A and 73B at their base ends which confront the valve seat members 62A and 62B, respectively.

The brake valve of the present embodiment, which has the above-described construction, operates in the manner as follows.

Firstly, as an operator switches the direction change-over valve 5 from the neutral position (a) to the change-over position (b), the oil pressure from the hydraulic pump 3 is introduced into the oil passage 54A on the side of the pressure source through the conduit 2A, and the check valve 70A is opened, disengaging from the valve seat 72A against the biasing force of the valve spring 71A. Upon opening, the check valve 70A is abutted against the fore end of the valve seat member 62A thereby substantially blocking communication between the valve seat member 62A, which is located at the inlet of the relief valve 59A, and the inlet link passage 56A.

In this instance, when the check valve 70A is opened, the oil pressure in the oil passage 54A on the side of the pressure source also prevails in the inlet link passage 56A. However, since the valve member 62A is in communication with the inlet link passage 56A only through the notched portion 73A, the flow of oil pressure into the valve seat member 62A from the inlet link passage 56A is restricted by throttling effects of the notched portion 73A.

In this state, as the oil pressure in the valve seat member 62A acts on the piston 67A through the throttle passage 65A of the main valve body 63A and the throttle passage 68A of the floating piston 69A, the piston 67A is slided within the oil chamber 66A until it is stopped by abutment against the valve casing 52 on the side of the oil chamber 58B. As a result, the main valve body 63A of the relief valve 59A is shifted from a state of low pressure relief to a state of high pressure relief, for the reasons which will be explained later. As to the accumulator 69B on the side of the relief valve 59B, the high oil pressure in the oil passage 55A on the side of the actuator is introduced into the oil chamber 66B through the outlet link passage 57A and oil chamber 58A to displace the piston 67B upward in the drawing, thereby holding the main valve body 63B of the relief valve 59B in a state which makes low pressure relief feasible.

Accordingly, in the state where the check valve 70A is opened into abutment against the valve seat member 62, while the piston 67A of the accumulator 69A is slided in the oil chamber 66A until it is stopped by abutment against the valve casing 52 on the side of the oil chamber 58B, the notched portion 73A which has throttling effects restricts the supply of the oil pressure during that period to a flow rate which simply permits the sliding displacement of the piston 67A. As a consequence, the pressure in the valve seat member 62A is maintained at a lower level than the pressure in the inlet link passage 56A, and the main valve body 63A is held substantially in a closed state by the biasing action of the valve spring 64A, without effecting the low pressure relief as in the prior art counterpart. Therefore, when the check valve 70A is opened against the action of the valve spring 71A, the pressure in the oil passage 55A on the side of the actuator is immediately held at a high pressure level.

Nextly, as the oil pressure in the oil passage 54A on the side of the pressure source is introduced into the cylinders 11A of the rotor 11 through the oil passage 55A on the side of the actuator and the charging/discharging passages 9, the pistons 14 are reciprocated in the cylinders 11A and as a result the shoes 16 are slided along the cam surface 7A, causing the rotor 11 to turn about the control pin 8. The rotation of the rotor 11 is led out through the output shaft 13 for rotational drive of an inertial body.

Further, part of the oil pressure which has been introduced into the oil passage 54A on the side of the pressure source is fed to the oil chamber 26A through the throttle passage of the spool 25, urging the spool 25 to move in the rightward direction in FIG. 2. Consequently, the land 25B is also moved to the right, opening the communication between the oil passage 54B on the side of the pressure source and the oil passage 55B on the side of the actuator to switch the counterbalance valve 23 from the neutral position (a) to the change-over position (b). The oil pressure which is pushed out of the cylinders 11A in each compression stroke of the pistons 14 is allowed to flow into the oil passage 55B on the side of the actuator through the charging/discharging passages 10, and discharged from the oil passage 55B to the outside of the brake valve through the oil passage 54B on the side of the pressure source for recirculation to the tank 4 through the direction change-over valve 5 and conduit 2B.

On the other hand, when the operator switches the direction change-over valve 5 from the change-over position (b) to the neutral position (a) for the purpose of stopping the rotation of the inertial body, the check valve 70A which is supplied with the oil pressure through the notched portion 73A is seated on the valve seat 72A under the influence of the biasing action of the valve spring 71A, thereby blocking communication between the oil passage 54A on the side of the pressure source and the oil passage 55A on the side of the actuator. Further, at the counterbalance valve 23, the pressure in the oil chamber 26A is lowered to permit the spool 25 to return to the neutral position (a) under the influence of the action of the return spring 27B, thereby blocking communication between the oil passage 54B on the side of the pressure source and the oil passage 55B on the side of the actuator.

Then, the oil pressure which is discharged into the oil passage 55B by the hydraulic motor 1, which is in forced rotation under the influence of the inertial force, is allowed to flow into the valve guide 60B through the inlet link passage 56B and the throttle passage 65B and to act on the piston 67B through the throttle passage 68B. As a result, the piston 67B is slided in the oil chamber 66B toward the oil chamber 58A. At this time, due to pressure losses through the throttle passages 65B and 68B, the pressure in the valve guide 60B is maintained at a level lower than the pressure in the oil passage 55B on the side of the actuator, so that the main valve body 63B is opened at a pressure level lower than a predetermined valve opening pressure to effect low pressure relief. Then, as the piston 67B comes to a stand by abutment against the valve casing 52, the pressure in the valve guide 60B equalizes with the pressure in the oil passage 55B on the side of the actuator, and rises to the predetermined valve opening pressure to effect high pressure relief.

While the relief valve 59B is open, the oil passages 55A and 55B on the side of the actuator are communicated with each other through the outlet link passage 57A. The oil passages 55A and 55B form a closed circuit together with the charging/discharging passages 9 and 10, and the oil pressure discharged from the hydraulic motor 1 is converted into thermal energy while being passed through the relief valve 59B thereby to produce a braking force.

In case the direction change-over valve 5 is switched from the neutral position (a) to the change-over position (c), the brake valve operates in a similar manner and therefore the description in this regard is omitted to avoid repetitions.

Thus, according to the present embodiment, the relief valves 59A and 59B and the check valves 70A and 70B are located substantially in coaxial relations with the oil passages 54A and 54B on the side of the pressure source, such that the fore ends of the valve seat members 62A and 62B at the inlets of the relief valves 59A and 59B are substantially closed by the check valves 70A and 70B upon opening the check valves 70A and 70B, respectively. Therefore, the supply of oil pressure into the valve seat members 62A and 62B is allowed only through the notched portions 73A and 73B which are formed on the check valves 70A and 70B. It follows that, during the period in which the pistons 67A and 67B of the floating pistons 69A and 69B are slided within the oil chambers 66A and 66B until they abut against the valve casing 52, the pressure in the valve seat members 62A and 62B is held at a low level, maintaining the main valve bodies 63A and 63B of the relief valves 59A and 59B substantially in closed state. Accordingly, when opening the check valves 70A and 70B to start the inertial body, low pressure relief by the relief valves 59A and 59B can be prevented or suppressed.

Consequently, it becomes possible to supply the oil pressure quickly to the hydraulic motor 1 to ensure high response characteristics in rotational drive, improving to a significant degree the safety and reliability of operation by securely preventing abrupt rotation of the hydraulic motor 1 which takes place at the end of the low pressure relief period in case of the prior art relief valves. Besides, the coaxial arrangement of the relief valves 59A and 59B and the check valves 70A and 70B permits to locate these components efficiently within the valve casing 52 in terms of compactness in construction of the brake valve 51 as a whole. Further, the notched portions 73A and 73B which are provided on the check valves 70A and 70B let the oil pressure intervene between the check valves 70A and 70B and the valve seat members 62A and 62B while the check valves 70A and 70B are open, thereby preventing tight contact between these component parts and making it possible to close the check valves 70A and 70B instantly when the direction change-over valve 5 is switched to the neutral position (a).

Figure 4:
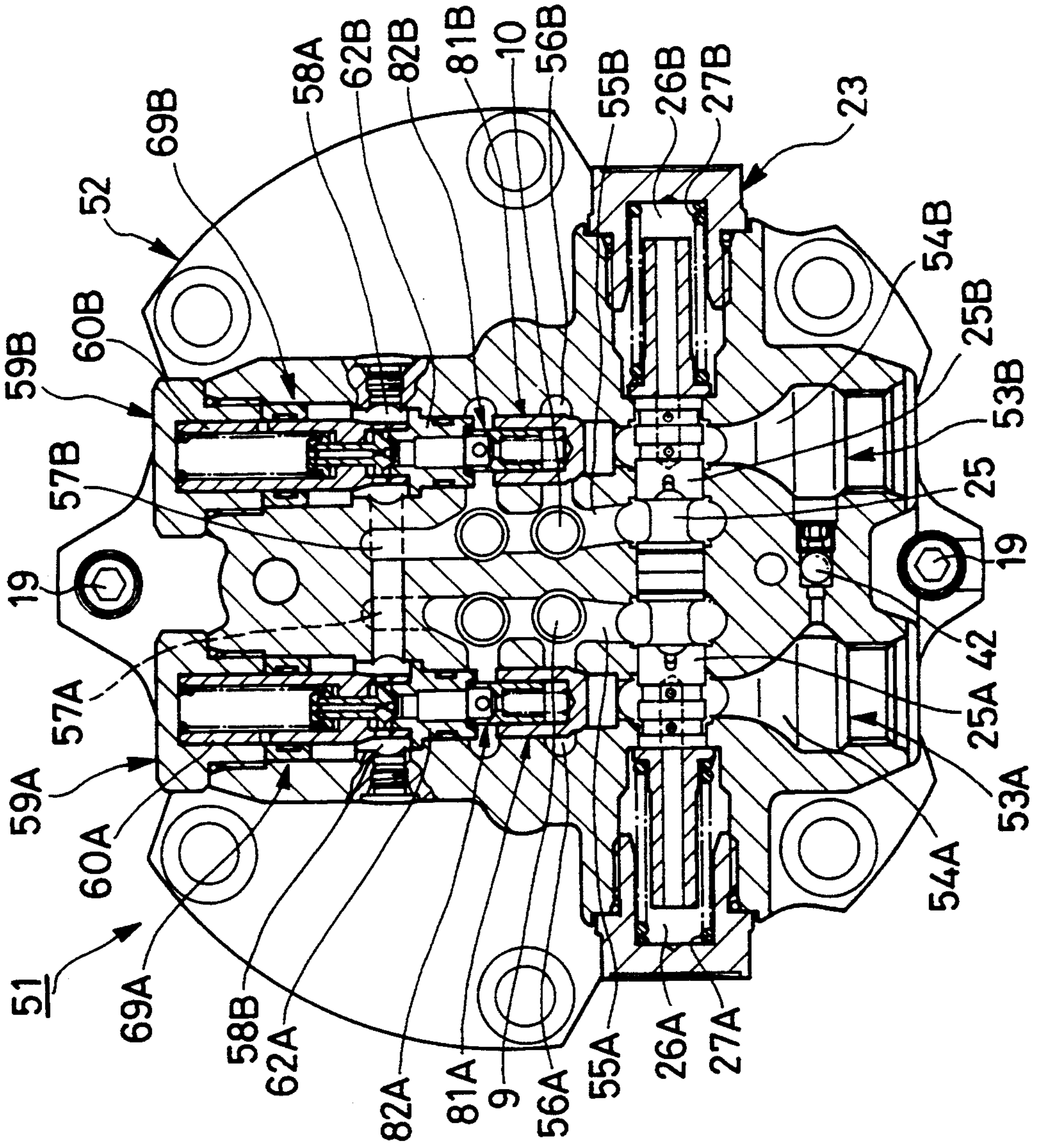
FIG. 4 is a sectional view of a brake valve constituting a second embodiment of the invention.
Figure 5:
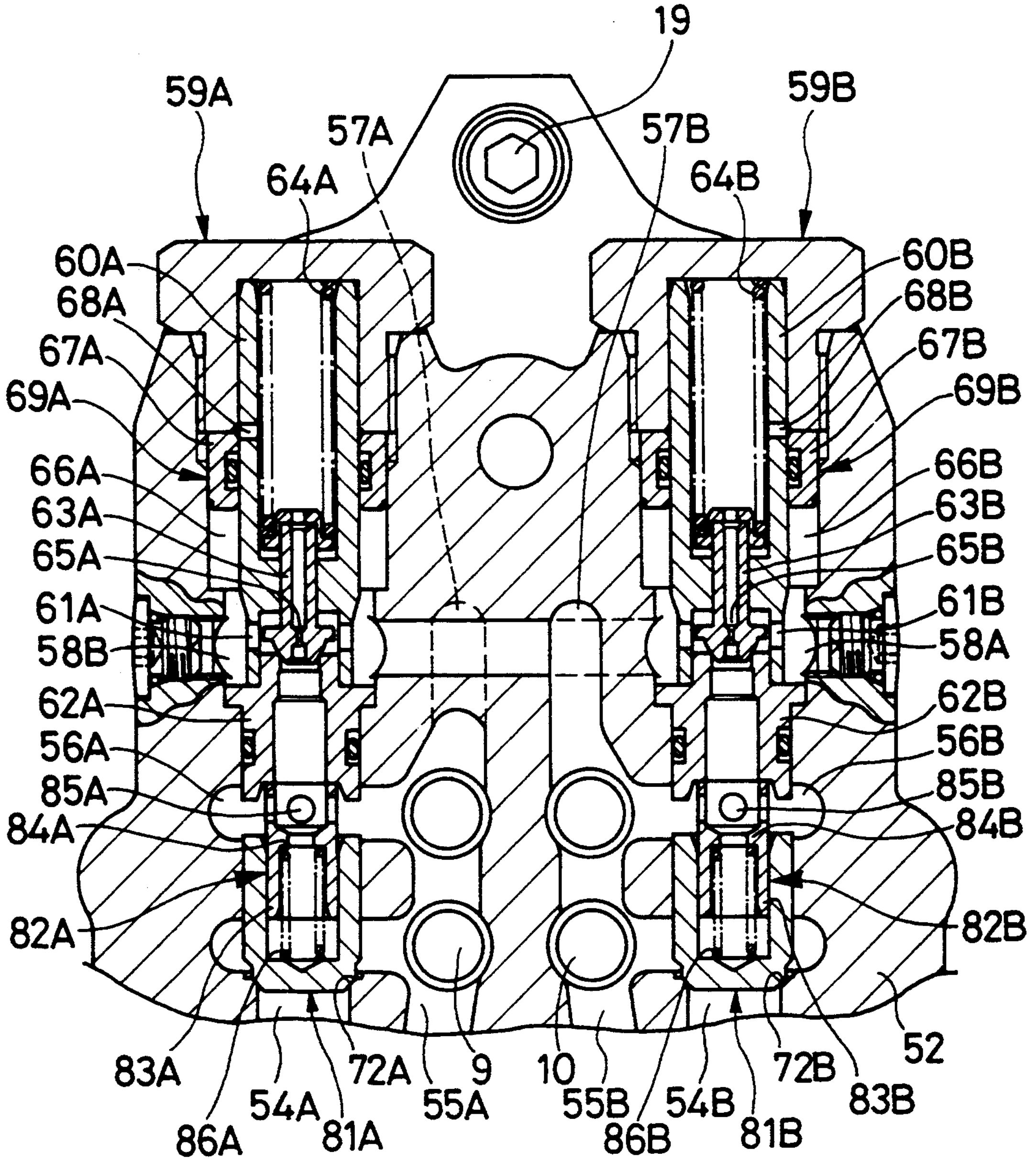
FIG. 5 is an enlarged sectional view of major parts shown in FIG. 4.
Figure 6:
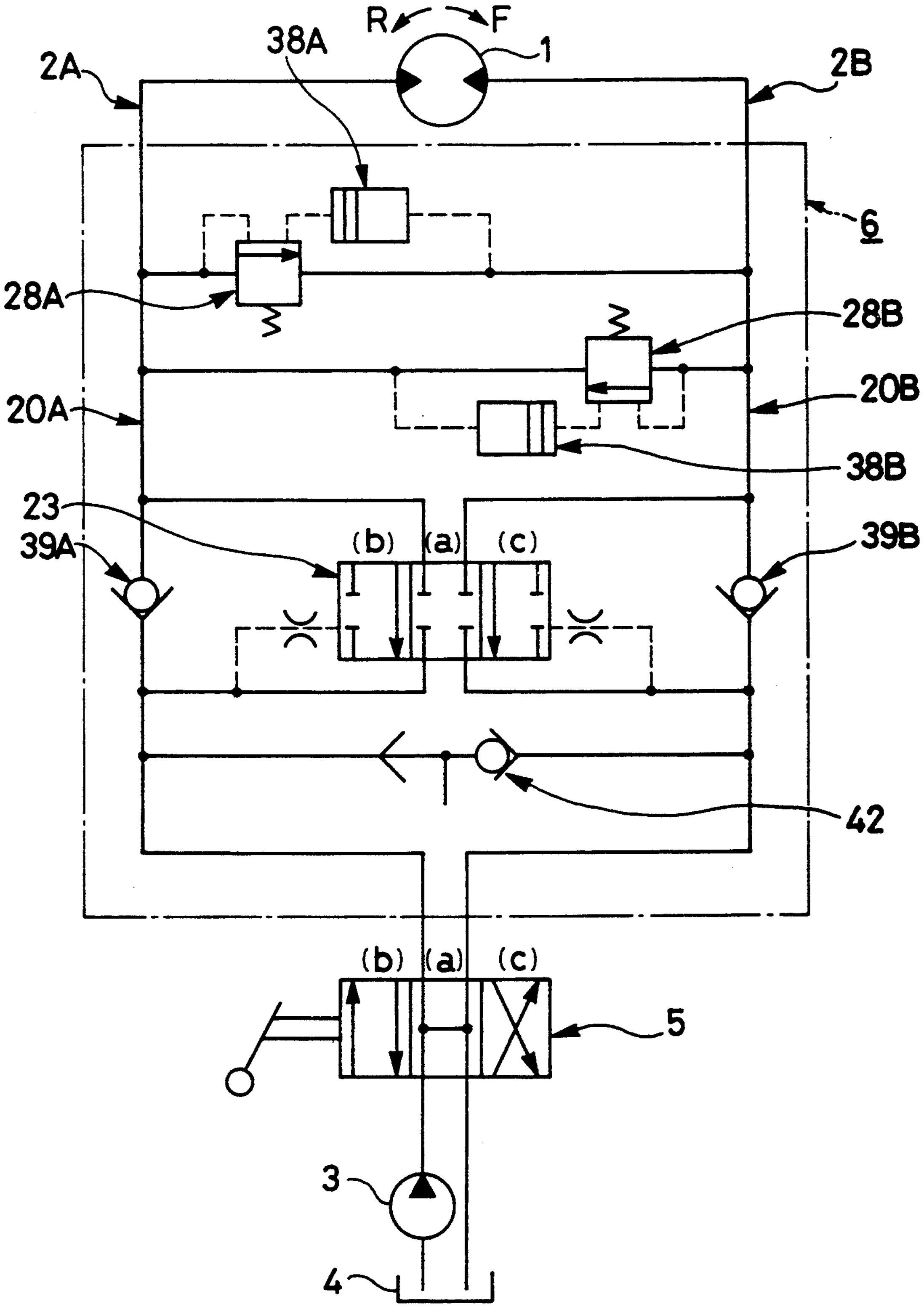
Fig. 6 PRIOR ART
FIG. 6 is a diagram of a hydraulic circuit employing a prior art brake valve.
Figure 7:
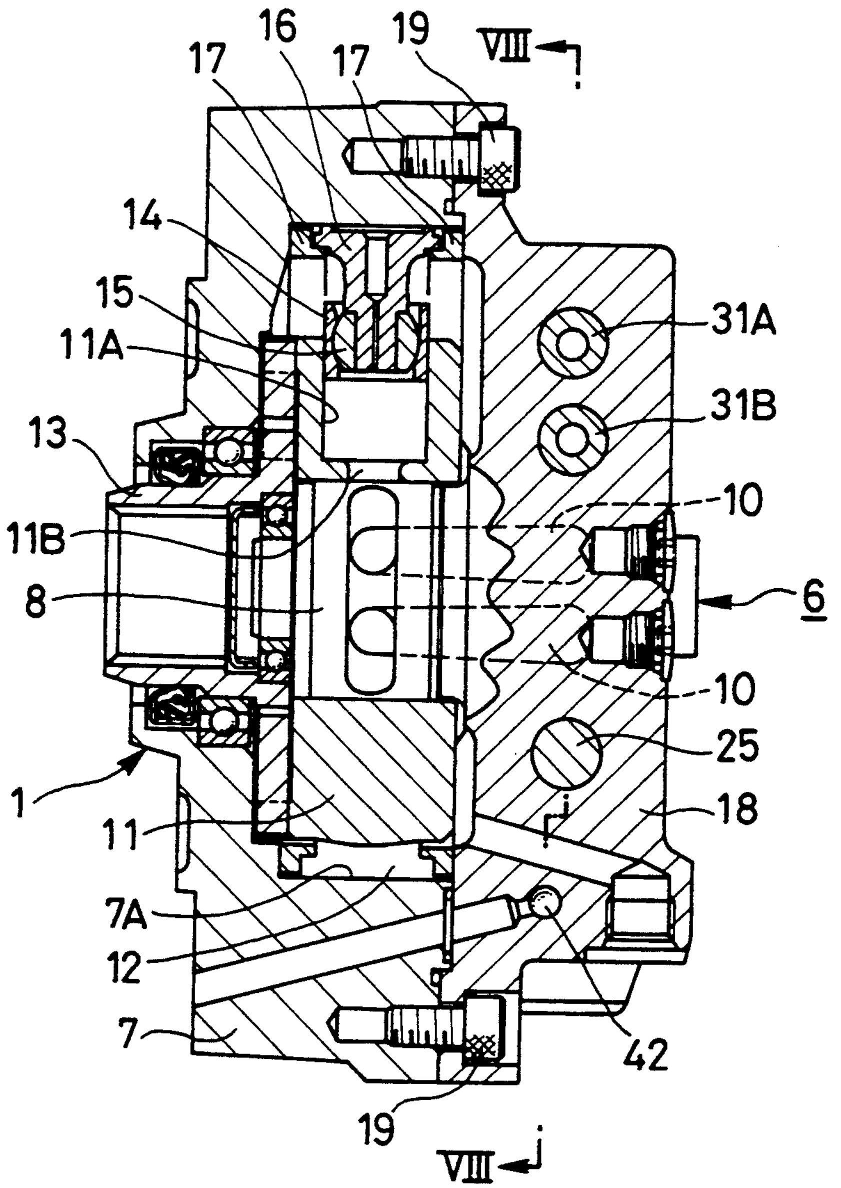
Fig. 7 PRIOR ART
FIG. 7 is a vertical sectional view of the brake valve shown in FIG. 6.
Figure 8:
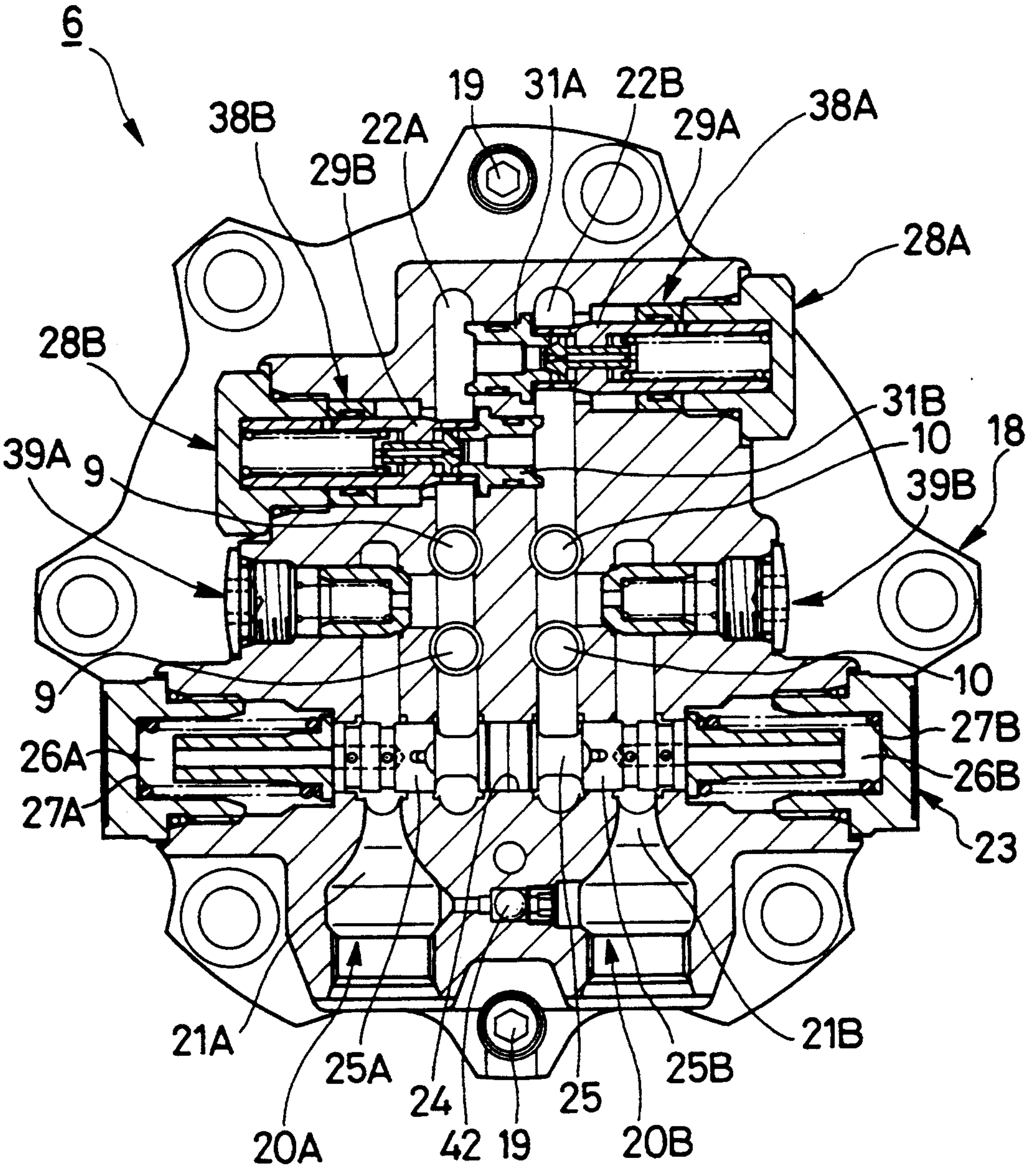
Fig. 8 PRIOR ART
FIG. 8 is a sectional view taken on line VIII—VIII of FIG. 7.
Figure 9:
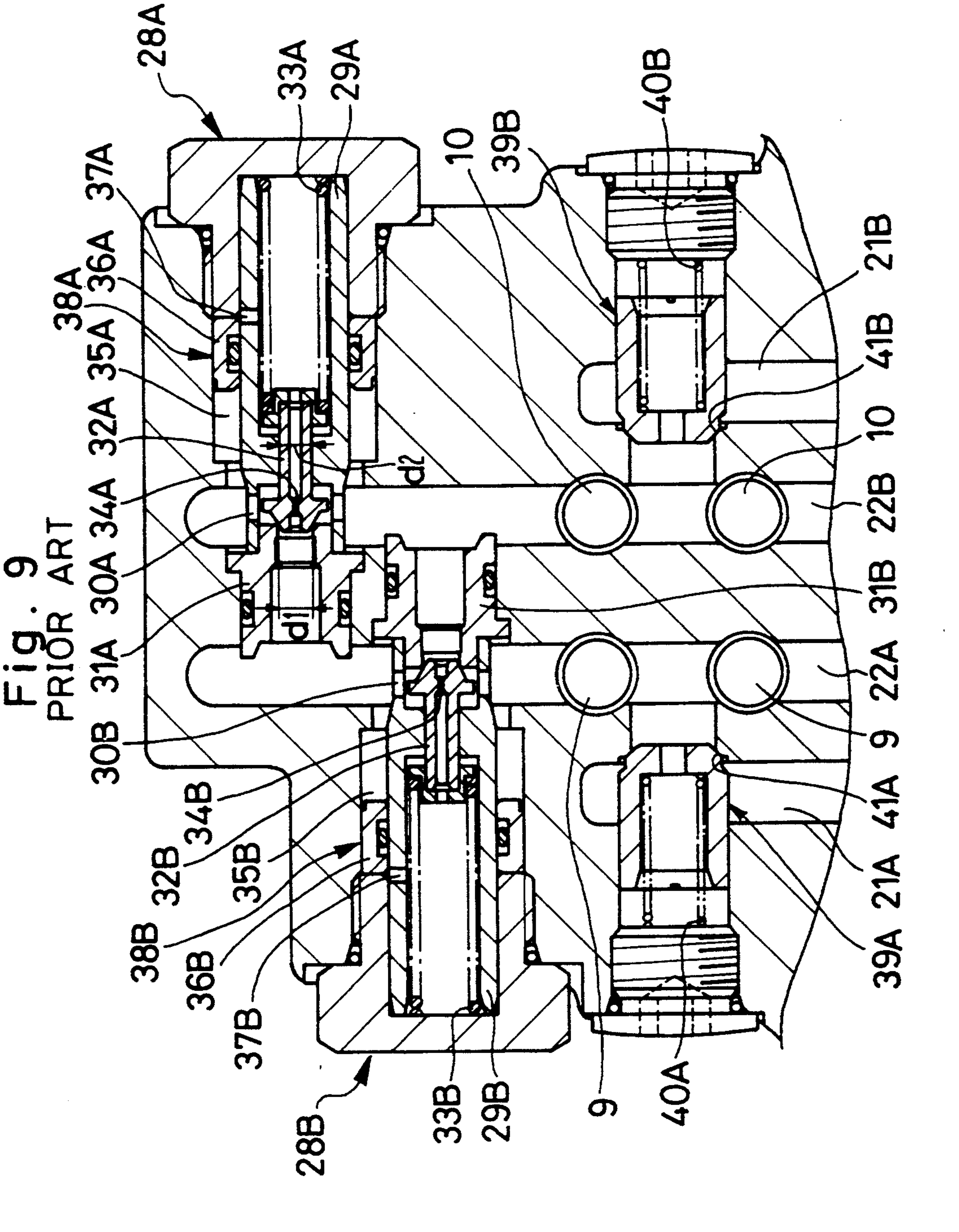
Fig. 9 PRIOR ART
FIG. 9 is an enlarged sectional view of major parts shown in FIG. 8.

Referring now to FIGS. 4 and 5, there is shown a second embodiment of the present invention, which employs throttle members between the valve seat members and the check valves. In the following description, those component parts which are common with the above-described first embodiment are designated by common reference numerals or characters, and accounts on such parts are omitted to avoid repetitions.

In these figures, the references 81A and 81B denote check valves which are provided within the lengths of the oil passages 53A and 53B in this embodiment. The check valves 81A and 81B are arranged in a manner similar to the check valves 70A and 70B of the above-described first embodiment except that outer peripheries of throttle members 82A and 82B, which will be described later, are slidably fitted in the check valves 81A and 81B.

Indicated at 82A and 82B are the throttle members of cylindrical shape, which are located between the valve seat members 62A and 62B and the check valves 81A and 81B, and slidable in the check valves 81A and 81B, respectively. The throttle members 82A and 82B are largely constituted by: stoppers 83A and 83B which are formed in the respective fore end portions for abutting engagement with the check valves 81A and 81B; spring stoppers 84A and 84B which are formed integrally in intermediate portions of the inner peripheries and projected radially inward of the respective throttle members; and a plural number of communication holes 85A and 85B bore in radially directions in the respective base end portions which confront the valve seat members 62A and 62B. Interposed between the spring stoppers 84A and 84B and the check valves 81A and 81B are valve springs 86A and 86B which constantly urge the check valves 81A and 81B toward the valve seats 72A and 72B, respectively. Further, under the influence of the biasing action of the valve springs 86A and 86B, the base ends of the throttle members 82A and 82B are urged into abutting engagement with inner peripheral portions at the fore ends of the valve sea t members 62A and 62B.

When the check valves 81A and 81B are opened, the throttle members 82A and 82B introduce a throttled flow of oil pressure between the valve seat members 62A and 62B and the check valves 81A and 81B, respectively, thereby suppressing low pressure relief actions of the relief valves 59A and 59B, while permitting to close the check valves 81A and 81B quickly at the time of stopping the hydraulic motor 1.

Further, by way of the communication holes 85A and 85B, the throttle members 82A and 82B produce a pressure differential between the inner and outer peripheries thereof to prevent chattering at the time of opening the check valves 81A and 81B, at the same time guiding the check valves 81A and 81B on the side of the inner peripheries thereof to seat the respective check valves 81A and 81B coaxially on the fore ends of the valve seat members 62A and 62B.

Thus, substantially the same operational effects as in the above-described first embodiment can be obtained from the second embodiment of the foregoing construction. Namely, upon opening the check valves 81A and 81B, the communication holes 85A and 85B of the throttle members 82A and 82B are throttled by the check valves 81A and 81B to restrict the flow of oil pressure into the valve seat members 62A and 62B. As a result, in the same manner as in the first embodiment, the pistons 67A and 67B of the floating pistons 69A and 69B are slided within the oil chambers 66A and 66B, holding the main valve bodies 63A and 63B of the relief valves 59A and 59B substantially in a closed position until a state of high pressure relief is reached, thereby preventing a low pressure relief action of the relief valves 59A and 59B at the time of starting the inertial body.

However, especially in this particular embodiment having the throttle members 82A and 82B, with communication holes 85A and 85B, slidably located between the valve seat members 62A and 62B and the check valves 81A and 81B, a large pressure differential is produced between the inner and outer sides of the throttle members 82A and 82B by way of the communication holes 85A and 85B for the purpose of stabilizing the opening action of the check valves 82A and 82B, respectively. Besides, the throttle members 82A and 82B serve to guide the check valves 81A and 81B from the side of the inner periphery thereof for moving the latter in coaxial relation with the valve seat members 62A and 62B, respectively.

Although the floating pistons 69A and 69B are shown as being located around the outer peripheries of the valve guides 60A and 60B in the foregoing embodiments, they may be provided within the valve guides or may be located in a more distant position if desired.

Further, a radial piston type hydraulic motor 1 has been shown as an example of actuator in the foregoing embodiments. However, it is to be understood that the present invention is not restricted to the particular form of actuator shown, and can be suitably used with actuators of different types such as a swash plate type hydraulic motor, a bent axis type hydraulic motor or the like.

Moreover, the present invention is applicable not only to brake valves of hydraulic power shovels and hydraulic cranes but also to brake valves of track vehicles driven by a hydraulic motor and automobile construction machines having an upper rotary working mechanism mounted on a lower travelling body.

Furthermore, in the above-described first embodiment, except the pressure flows through the notched portions 73A and 73B, the communications between the relief valves 59A and 59B and the check valves 70A and 70B are substantially blocked during the period in which the relief valves 59A and 59B are shifted from a state of low pressure relief to a state of high pressure relief by a sliding movement of the pistons 67A and 67B of the floating pistons 69A and 69B, respectively. Accordingly, even if the main valve bodies 63A and 63B of the relief valves 59A and 59B were put in a valve opening stroke to a certain extent to cause leaks to the tank side during the low pressure relief, the flow of oil pressure to the lower pressure side is suppressed to an extremely small amount by the throttling effects of the notched portions 73A and 73B. Therefore, it does not affect the response characteristics of the hydraulic motor 1 when starting same, that is to say, the hydraulic motor 1 can be started quickly. The same applies to the second embodiment described above.

POSSIBILITIES OF INDUSTRIAL UTILIZATION

As clear from the foregoing detailed description, according to the present invention, the check valves are located in particular positional relations with the relief valves such that the flow of oil pressure from the pressure source to each of the relief valves is restricted by the check valves upon opening same, thereby to suppress low pressure relief actions by the respective relief valves. It follows that, when the check valves are opened by the oil pressure from the pressure source, the relief valves can be retained in closed state. As a consequence, it becomes possible to supply the oil pressure quickly to the actuator and to put the actuator in rotation with high response characteristics. This contributes to improve the safety and reliability of operation, securely preventing the actuator from being abruptly driven after lapse of a predetermined low pressure relief time of the accumulator as in the case of the prior art counterpart.

Further, the check valves are arranged coaxially with the corresponding relief valves and, when opened, to close the inlets of the relief valves, making it possible to restrict the flow of oil pressure to the relief valves at the time of valve opening and thereby to suppress low pressure relief actions by the relief valves. The coaxial arrangement of the relief and check valves permits to accommodate these components efficiently in a casing and to make the brake valve construction compact as a whole.

What is claimed is:

1. A fluid control system including a casing, a pair of oil passages provided in said casing and connected between a hydraulic pressure source and an actuator, a counterbalance valve located within said oil passages at positions closer to said hydraulic pressure source, a pair of relief valves located within of said oil passages at positions closer to said actuator and each provided with a floating piston to hold an opening pressure for each said relief valve at a low level for a predetermined time period, and a pair of check valves located within said oil passages at positions between one of said relief valves and said counterbalance valve to permit hydraulic pressure flow from said pressure source toward said actuator while blocking hydraulic pressure flows in the reverse direction, characterized in that said check valves are located in particular positional relations with said relief valves and arranged to restrict the flow of hydraulic pressure from said pressure source to the corresponding one of said relief valves when opened, thereby suppressing low pressure relief actions by said relief valves.

2. A fluid control system including a casing, a pair of oil passages provided in said casing and connected between a hydraulic pressure source and an actuator, a counterbalance valve located within said oil passages at positions closer to said hydraulic pressure source, a pair of relief valves located within said oil passages at positions closer to said actuator and each provided with a floating piston to hold an opening pressure for each said relief valve at a low level for a predetermined time period, and a pair of check valves located within said oil passages at positions between one of said relief valves and said counterbalance valve to permit hydraulic pressure flow from said pressure source toward said actuator while blocking hydraulic pressure flows in the reverse direction, characterized in that said check valves are located in coaxial positions relative to a corresponding one of said relief valves and arranged to substantially close the inlet of the corresponding one of said relief valves when opened, thereby suppressing low pressure relief actions by said relief valves.

3. A brake valve as defined in claim 1 or 2, wherein said check valves are provided with a notched portion at an end confronting the corresponding one of said relief valves.

4. A brake valve as defined in claim 1 or 2, further comprising a cylindrical throttle member having a radially bored communication hole and slidably fitted therein in each relief valve in confronting relation with the corresponding one of said relief valves, and a valve spring interposed between said throttle member and said check valve to urge said throttle member toward said relief valve.

* * * * *